US00RE40539E

(19) United States
(12) Reissued Patent
Fugere

(10) Patent Number: US RE40,539 E
(45) Date of Reissued Patent: Oct. 14, 2008

(54) FLUID PUMP AND CARTRIDGE

(75) Inventor: Jeffrey P. Fugere, Hampton Falls, NH (US)

(73) Assignee: DL Technology LLC, Haverhill, MA (US)

(21) Appl. No.: 10/948,850

(22) Filed: Sep. 23, 2004

Related U.S. Patent Documents

Reissue of:
(64) Patent No.: 6,511,301
Issued: Jan. 28, 2003
Appl. No.: 09/702,522
Filed: Oct. 31, 2000

U.S. Applications:
(60) Provisional application No. 60/186,783, filed on Mar. 3, 2000, and provisional application No. 60/163,952, filed on Nov. 8, 1999.

(51) Int. Cl.
*F04B 35/00* (2006.01)
*F04B 17/00* (2006.01)

(52) U.S. Cl. ..... 417/359; 222/251; 222/388
(58) Field of Classification Search ..... 417/205, 417/360, 410.3; 418/220; 222/412, 413, 325, 222/327, 390, 391
See application file for complete search history.

(56) References Cited

U.S. PATENT DOCUMENTS

| | | | | |
|---|---|---|---|---|
| 2,933,259 | A | 4/1960 | Raskin | 239/405 |
| 3,355,766 | A | 12/1967 | Causemann et al. | 18/12 |
| 3,394,659 | A | 7/1968 | Van Alen | 103/87 |
| 3,507,584 | A * | 4/1970 | Robbins, Jr. | 417/439 |
| 3,693,884 | A | 9/1972 | Snodgrass et al. | 239/427.5 |
| 3,734,635 | A | 5/1973 | Blach et al. | 415/72 |
| 3,811,601 | A | 5/1974 | Reighard et al. | 222/146 HE |
| 3,938,492 | A | 2/1976 | Mercer, Jr. | 125/11 |
| 3,963,151 | A | 6/1976 | North, Jr. | 222/309 |
| 4,004,715 | A | 1/1977 | Williams et al. | 222/30 |
| 4,077,180 | A | 3/1978 | Agent et al. | 53/37 |
| 4,116,766 | A | 9/1978 | Poindexter et al. | 176/38 |
| 4,239,462 | A | 12/1980 | Dach et al. | 417/373 |
| 4,258,862 | A | 3/1981 | Thorsheim | 222/56 |
| 4,312,630 | A | 1/1982 | Travaglini | 425/568 |
| 4,339,840 | A | 7/1982 | Monson | 15/321 |
| 4,377,894 | A | 3/1983 | Yoshida | 29/421 R |
| 4,386,483 | A | 6/1983 | Schlaefli | 51/5 D |
| 4,513,190 | A | 4/1985 | Ellett et al. | 219/56.21 |
| 4,572,103 | A | 2/1986 | Engel | 118/697 |
| 4,584,964 | A | 4/1986 | Engel | 118/697 |
| 4,610,377 | A | 9/1986 | Rasmussen | 222/288 |
| 4,705,218 | A | 11/1987 | Daniels | 239/271 |
| 4,705,611 | A | 11/1987 | Grimes et al. | 204/129.1 |
| 4,785,996 | A | 11/1988 | Ziecker et al. | 239/298 |

(Continued)

FOREIGN PATENT DOCUMENTS

| | | |
|---|---|---|
| EP | 0110591 | 10/1986 |

OTHER PUBLICATIONS

Karassik et al., "Pump Handbook" end Ed., McGraw Hill Inc., 1986, pp. 9.30.*

*Primary Examiner*—Devon Kramer
*Assistant Examiner*—Vikansha Dwivedi
(74) *Attorney, Agent, or Firm*—Mills & Onello, LLP

(57) ABSTRACT

In a fluid pump and cartridge assembly, a cartridge includes a material inlet port, a material outlet port, and a feed screw. The feed screw delivers fluid to be dispensed from the fluid inlet to the outlet port. The fluid inlet is preferably elongated in a direction along a longitudinal axis of the feed screw to enhance consistency in material flow through the cartridge. The feed screw is preferably driven by a closed-loop servo motor to achieve high-performance dispensing resolution. The assembly is preferably compatible with fixed-z and floating-z cartridges.

98 Claims, 8 Drawing Sheets

U.S. PATENT DOCUMENTS

| | | | | | |
|---|---|---|---|---|---|
| 4,836,422 | A | | 6/1989 | Rosenberg | 222/190 |
| 4,859,073 | A | | 8/1989 | Howseman, Jr. et al. | 366/195 |
| 4,919,204 | A | | 4/1990 | Baker et al. | 166/223 |
| 4,941,428 | A | | 7/1990 | Engel | 118/680 |
| 4,969,602 | A | | 11/1990 | Scholl | 239/298 |
| 5,106,291 | A | | 4/1992 | Gellert | 425/549 |
| 5,130,710 | A | | 7/1992 | Salazar | 341/11 |
| 5,176,803 | A | | 1/1993 | Barbuto et al. | 204/129.1 |
| 5,177,901 | A | | 1/1993 | Smith | 51/5 D |
| RE34,197 | E | | 3/1993 | Engel | 118/680 |
| 5,265,773 | A | | 11/1993 | Harada | 222/261 |
| 5,348,453 | A | | 9/1994 | Baran et al. | 417/440 |
| 5,407,101 | A | | 4/1995 | Hubbard | 222/146.5 |
| 5,452,824 | A | | 9/1995 | Danek et al. | 222/47 |
| 5,535,919 | A | | 7/1996 | Ganzer et al. | 222/1 |
| 5,553,742 | A | * | 9/1996 | Maruyama et al. | 222/1 |
| 5,564,606 | A | * | 10/1996 | Engel | 222/261 |
| 5,699,934 | A | | 12/1997 | Kolcun et al. | 222/1 |
| 5,765,730 | A | | 6/1998 | Richter | 222/590 |
| 5,785,068 | A | | 7/1998 | Sasaki et al. | 134/144 |
| 5,795,390 | A | | 8/1998 | Cavallaro | 118/314 |
| 5,819,983 | A | | 10/1998 | White et al. | 222/1 |
| 5,823,747 | A | | 10/1998 | Ciavarini et al. | 417/216 |
| 5,833,851 | A | | 11/1998 | Adams et al. | 210/413 |
| 5,837,892 | A | | 11/1998 | Cavallaro et al. | 73/149 |
| 5,886,494 | A | | 3/1999 | Prentice et al. | 318/625 |
| 5,903,125 | A | | 5/1999 | Prentice et al. | 318/625 |
| 5,904,377 | A | | 5/1999 | Throup | 285/39 |
| 5,918,648 | A | | 7/1999 | Carr et al. | 141/198 |
| 5,925,187 | A | | 7/1999 | Freeman et al. | 118/667 |
| 5,927,560 | A | | 7/1999 | Lewis et al. | 222/263 |
| 5,931,355 | A | | 8/1999 | Jefferson | 222/413 |
| 5,947,022 | A | | 9/1999 | Freeman et al. | 101/123 |
| 5,947,509 | A | * | 9/1999 | Ricks et al. | 280/728.2 |
| 5,957,343 | A | | 9/1999 | Cavallaro | 222/504 |
| 5,971,227 | A | * | 10/1999 | White et al. | 222/333 |
| 5,984,147 | A | | 11/1999 | Van Ngo | 222/240 |
| 5,985,029 | A | | 11/1999 | Purcell | 118/324 |
| 5,985,216 | A | | 11/1999 | Rens et al. | 422/73 |
| 5,992,688 | A | | 11/1999 | Lewis et al. | 222/1 |
| 5,992,698 | A | * | 11/1999 | Copeland et al. | 222/180 |
| 5,995,788 | A | * | 11/1999 | Baek | 399/238 |
| 6,007,631 | A | | 12/1999 | Prentice et al. | 118/669 |
| 6,017,392 | A | | 1/2000 | Cavallaro | 118/314 |
| 6,025,689 | A | | 2/2000 | Prentice et al. | 318/625 |
| 6,068,202 | A | | 5/2000 | Hynes et al. | 239/290 |
| 6,082,289 | A | | 7/2000 | Cavallaro | 118/300 |
| 6,085,943 | A | * | 7/2000 | Cavallaro et al. | 222/309 |
| 6,093,251 | A | | 7/2000 | Carr et al. | 118/712 |
| 6,112,588 | A | | 9/2000 | Cavallaro et al. | 73/149 |
| 6,119,895 | A | | 9/2000 | Fugere et al. | 222/1 |
| 6,126,039 | A | | 10/2000 | Cline et al. | 222/63 |
| 6,157,157 | A | | 12/2000 | Prentice et al. | 318/625 |
| 6,196,521 | B1 | | 3/2001 | Hynes et al. | 251/61.1 |
| 6,199,566 | B1 | | 3/2001 | Gazewood | 134/166 C |
| 6,206,964 | B1 | | 3/2001 | Purcell et al. | 118/314 |
| 6,207,220 | B1 | | 3/2001 | Doyle et al. | 427/96 |
| 6,214,117 | B1 | | 4/2001 | Prentice et al. | 118/669 |
| 6,216,917 | B1 | | 4/2001 | Crouch | 222/146.5 |
| 6,224,671 | B1 | | 5/2001 | Cavallaro | 118/314 |
| 6,224,675 | B1 | | 5/2001 | Prentice et al. | 118/669 |
| 6,234,358 | B1 | | 5/2001 | Romine et al. | 222/181.3 |
| 6,253,957 | B1 | | 7/2001 | Messerly et al. | 221/1 |
| 6,253,972 | B1 | | 7/2001 | DeVito et al. | 222/504 |
| 6,257,444 | B1 | | 7/2001 | Everett | 222/1 |
| 6,258,165 | B1 | | 7/2001 | Cavallaro | 118/323 |
| 6,322,854 | B1 | | 11/2001 | Purcell et al. | 427/421 |
| 6,324,973 | B2 | | 12/2001 | Rossmeisl et al. | 101/123 |
| 6,354,471 | B2 | * | 3/2002 | Fujii | 222/380 |
| 6,371,339 | B1 | | 4/2002 | White et al. | 222/413 |
| 6,378,737 | B1 | | 4/2002 | Cavallaro et al. | 222/309 |
| 6,383,292 | B1 | | 5/2002 | Brand et al. | 118/315 |
| 6,386,396 | B1 | | 5/2002 | Strecker | 222/261 |
| 6,391,378 | B1 | | 5/2002 | Carr et al. | 427/8 |
| 6,395,334 | B1 | | 5/2002 | Prentice et al. | 427/256 |
| 6,412,328 | B1 | | 7/2002 | Cavallaro et al. | 73/1.74 |
| 6,453,810 | B1 | | 9/2002 | Rossmeisl et al. | 101/123 |
| 6,511,301 | B1 | | 1/2003 | Fugere | 417/359 |
| 6,514,569 | B1 | | 2/2003 | Crouch | 427/421 |
| 6,540,832 | B2 | | 4/2003 | Cavallaro | 118/314 |
| 6,541,063 | B1 | | 4/2003 | Prentice et al. | 427/8 |
| 6,562,406 | B1 | | 5/2003 | Chikahisa et al. | 427/256 |
| 6,619,198 | B2 | | 9/2003 | Rossmeisl et al. | 101/129 |
| 6,626,097 | B2 | | 9/2003 | Rossmeisl et al. | 101/123 |
| 2002/0007227 | A1 | | 1/2002 | Prentice et al. | 700/121 |
| 2002/0020350 | A1 | | 2/2002 | Prentice et al. | 118/669 |
| 2003/0000462 | A1 | | 1/2003 | Prentice et al. | 118/300 |
| 2003/0066546 | A1 | | 4/2003 | Bibeault et al. | 134/21 |
| 2003/0084845 | A1 | | 5/2003 | Prentice et al. | 118/679 |
| 2003/0091727 | A1 | | 5/2003 | Prentice et al. | 427/8 |
| 2003/0132243 | A1 | | 7/2003 | Engel | 222/61 |
| 2004/0089228 | A1 | | 5/2004 | Prentice et al. | 118/300 |

* cited by examiner

FLUID PUMP AND CARTRIDGE

Matter enclosed in heavy brackets [ ] appears in the original patent but forms no part of this reissue specification; matter printed in italics indicates the additions made by reissue.

RELATED APPLICATIONS

This application claims the benefit of U.S. Provisional Application No. 60/186,763, filed Mar. 3, 2000 and U.S. Provisional Application No. 60/163,952, filed Nov. 8, 1999 the contents of which are incorporated herein by reference, in their entirety.

BACKGROUND OF THE INVENTION

Contemporary fluid dispense systems are well suited for dispensing precise amounts of fluid at precise positions on a substrate. A pump transports the fluid to a dispense tip, also referred to as a "pin" or "needle", which is positioned over the substrate by a micropositioner, thereby providing patterns of fluid on the substrate as needed. As an example application, fluid delivery systems can be utilized for depositing precise volumes of adhesives, for example, glue, resin, or paste, during a circuit board assembly process, in the form of dots for high-speed applications, or in the form of lines for providing underfill or encapsulation.

Contemporary dispensing pumps comprise a syringe, a feed tube, a dispense cartridge, and pump drive mechanism. The syringe contains fluid for dispensing, and has an opening at its distal end at which a feed tube is connected. The feed tube is a flexible, hollow tube for delivering the fluid to the cartridge. The cartridge is hollow and cylindrical and includes an inlet neck at which the opposite end of the feed tube is connected. The inlet neck directs the fluid into the hollow, central cartridge chamber.

A feed screw disposed longitudinally through the center of the cylindrical chamber transports the fluid in Archimedes principle fashion from the inlet to a dispensing needle attached to the chamber outlet. A continuously-running motor drives the feed screw via a rotary clutch, which is selectively actuated to engage the feed screw and thereby effect dispensing. A bellows linkage between the motor and cartridge allows for flexibility in system alignment.

Pump systems can be characterized generally as "fixed-z" or "floating-z" (floating-z is also referred to as "compliant-z"). Fixed-z systems are adapted for applications that do not require contact between the dispense tip and the substrate during dispensing. In fixed-z applications, the dispense tip is positioned and suspended above the substrate by a predetermined distance, and the fluid is dropped onto the substrate from above. In floating-z applications, the tip is provided with a standoff, or "foot", designed to contact the substrate as fluid is delivered by the pump through the tip. Such floating-z systems allow for tip travel, relative to the pump body, such that the entire weight of the pump does not bear down on the substrate.

Such conventional pump systems suffer from several limitations. The motor and rotary clutch mechanisms are bulky and heavy, and are therefore limited in application for modern dispensing applications requiring increasingly precise, efficient, and fast operation. The excessive weight limits use for those applications that require contact of the pump with the substrate, and limits system speed and accuracy, attributed to the high g-forces required for quick movement of the system. The mechanical clutch is difficult to control, and coasts to a stop when disengaged, resulting in deposit of excess fluid. Clutch coasting can be mitigated by a longitudinal spring mounted about the body of the feed screw and urged against the chamber end to offer rotational resistance. However, the spring adds to the length of the cartridge, and contributes to system complexity.

The inlet neck feeds directly into the side of the feed screw or "auger". Consequently, as the auger collects material from the small and circular inlet port, high pressure is required for driving the material into the auger body, because the auger threads periodically pass in front of the feed opening, preventing material from entering. This leads to inconsistent material flow. Additionally, the inlet neck is commonly perpendicular to the auger screw, requiring the fluid to make a 90 degree turn upon entering the pump. This further limits material flow and can contribute to material "balling" and clogging.

Overnight storage of dispensed fluids often requires refrigeration of the fluid and cleaning of the system. The syringe is typically mounted directly to a mounting bracket on the pump body such that the output port of the syringe passes through a aperture on the mounting bracket. The feed tube is then coupled to the output port on the opposite face of the bracket. Since the tube and bracket are on opposite sides of the bracket, removal of the syringe from the pump body requires dismantling of the tube and syringe, which can contaminate fluid material positioned at the interface during disassembly. Further, since the syringe and cartridge can not be removed and stored together as a unit, disassembly and cleaning of the cartridge is required. Additionally, the inlet neck is narrow and therefore difficult to clean.

SUMMARY OF THE INVENTION

The present invention is directed to a fluid group and cartridge system that overcomes the limitations of conventional systems set forth above.

In a first aspect, the present invention is directed to a cartridge adapted for use with a fluid pump. The cartridge includes a material inlet port, a material outlet port, a feed screw, and a reservoir. The feed screw is disposed longitudinally through the body of the cartridge for delivering fluid provided at the inlet port to the outlet port. The inlet port takes the form of an elongated port provided at a side portion of the feed screw proximal to allow for fluid provided at the inlet port. This elongated configuration promotes even distribution of fluid during transport by the feed screw, and lowers system pressure, thereby reducing the likelihood of "balling-up" and/or clogging of fluid.

The inlet port is preferably provided through the cartridge body at an acute angle relative to the reservoir to allow for gravity-assisted fluid delivery. The inner portion of the cartridge may be lined with a carbide or plastic (for example Teflon, torlon, or tercite) liner having an aperture aligned with the inlet port to enhance ease of cleaning. The elongated port of the cartridge may be provided in a wall of the carbide liner.

In another aspect, the present invention is directed to a release bracket for mounting the syringe and cartridge to the body of the pump. In this manner, the syringe, feed tube, and cartridge can be dismantled from the pump body as a unit, allowing for joint storage of the syringe, feed tube and cartridge, while minimizing risk of contamination of the material. Additionally, once the system is initially purged of extraneous gas during initialization, the purged system can be stored as a unit without the need for re-initialization prior to its next use.

In another aspect, the present invention is directed to a fluid pump assembly that employs an electronicallyoperated servo-motor assembly. A closed-loop servo motor having a rotary encoder is adapted for controlling rotation and position of the feed screw with heightened accuracy, as compared to those of conventional clutch-driven assemblies. For example, in a preferred embodiment, a rotary encoder capable of 8000 counts in a 360 degree range may be employed to achieve dispensing resolution to a degree that is orders of magnitude greater than conventional systems. Servo-motor-based systems further confer the advantages of small, lightweight systems well-suited for high-performance operation. Electronic control allows for complete determination of the acceleration/deceleration of feed screw rotation, allowing for application-specific flow profiles. An orbital gear transmission unit may be provided between the motor and the pump feed screw for providing further accuracy in controlling the feed screw.

In another aspect, the present invention is directed to a pump assembly that is compatible with both floating-z and fixed-z cartridges and dispensing tips. A quick-release pin, which may be spring-biased, is provided on the side of the cartridge body to allow for removal/insertion of cartridges. A fixed-z cartridge includes a hole for receiving the quick-release pin in a fixed relationship. A floating-z cartridge includes a longitudinal groove to permit longitudinal travel of the pin in the groove, and thus allow for floating-z operation.

In another aspect, the present invention is directed to a quick-release mount assembly for mounting a pump to a dispensing frame. The pump body includes a tab feature on its surface for mating with a hole on a mounting plate attached to the dispensing frame. The mounting plate includes a lever for securing the tab when inserted. Guide features may be provided for aligning and guiding the pump body relative to the mounting plate.

In another aspect, the present invention is directed to an apparatus and method for drawing entrapped air from the material supply during a dispensing operation, thereby purging the system of entrapped air. A vacuum is drawn from the material supply, for example by a vacuum tube with needle inserted into a material feed tube, in a direction parallel to material flow through the feed tube. In this manner, air is withdrawn from the dispensed material, leading to an improvement in dispensing consistency, especially at small tolerances.

In another aspect, the present invention is directed to a vacuum purge configuration for removing air entrapped in the body of the cartridge during initialization of a dispensing operation. A first purge interface is placed on the end of the feed tube, and a vacuum is drawn, thereby purging the feed tube of entrapped gas. A second purge interface is then placed on the cartridge body outlet while the feed screw is rotated slowly until material presents itself at the outlet. A vacuum is drawn to eliminate entrapped gas from the cartridge. A third purge interface is then placed on the needle assembly and a vacuum is drawn to eliminate entrapped air from the needle body. Entrapped air is thus substantially removed from the feed tube, auger screw and dispensing needle. Normal dispensing can commence following removal of the purge interface.

In another aspect, the present invention is directed to a bellows means inserted at the piston end of, and replacing the piston of, a dispensing syringe. The bellows is pressurized from within and expands, thereby exerting pressure on the underlying material, forcing material flow. In this manner, material can be driven with minimal pressure, and with minimal air migration into the material, as compared to plunger-style drivers. In a preferred embodiment, the bellows comprises a latex film applied about the lip of the syringe top. The syringe top is preferably vented to allow for expansion of the bellows.

In another aspect, the present invention is directed to a pump cartridge having a material feed aperture that is elongated with respect to the primary axis of the feed screw. In this manner, a larger portion of the feed screw threads are exposed to the material supply, leading to improvement in dispensing consistency. In a preferred embodiment, a carbide cartridge liner is inserted in the cartridge cavity between the cartridge body and the feed screw, and the elongated aperture is provided in the body of the carbide insert to provide increased material supply exposure.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1B:
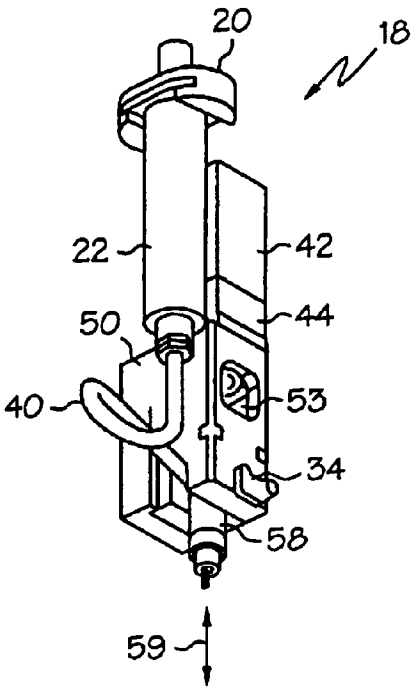
FIGS. 1A and 1B are an exploded perspective view and an assembled perspective view respectively of a pump assembly configured in accordance with the present invention.
Figure 1A:
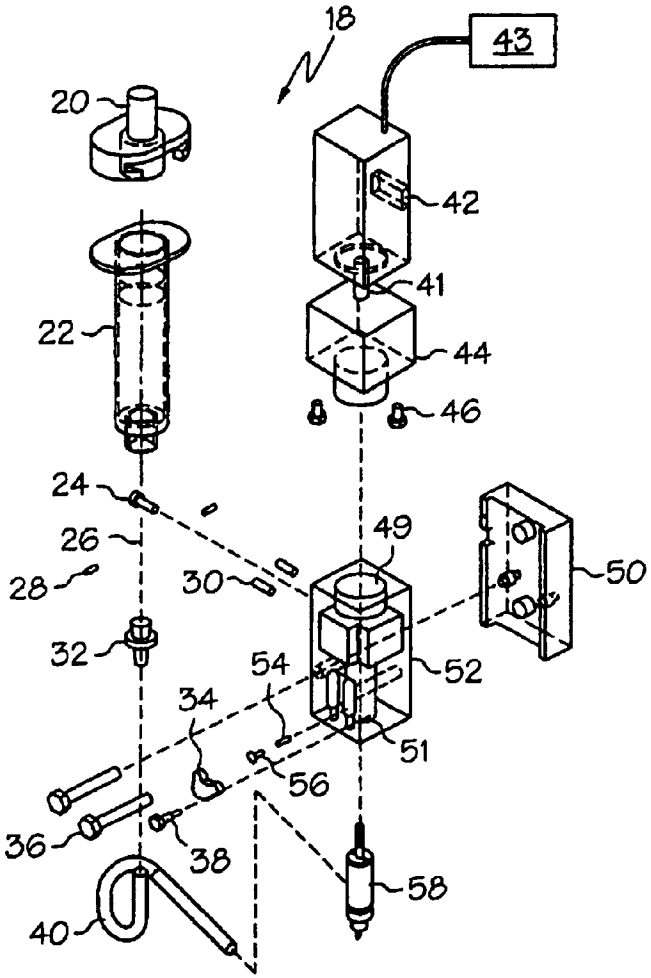

FIGS. 1A and 1B are an exploded perspective view and an assembled perspective view respectively of a pump assembly configured in accordance with the present invention. With reference to FIGS. 1A and 1B, an embodiment of the dispensing pump 18 comprises a motor 42, an optional transmission box 44, a pump housing 52, and a cartridge 58.

The motor 42 preferably comprises a closed-loop servo motor with an independent motion controller 43. The motion controller 43 may be provided by the host dispensing platform, and may comprise, for example, a Delta Tau controller, Northbridge, Calif., USA. The closed-loop servo motor may comprise, for example, a Sigma Mini Series motor, produced by Yaskawa Electric Corp., Japan. Feedback is preferably provided by a rotary encoder, for example providing 8192 discrete counts over 360 degree rotation. The motor 42 includes an axle 41 which operates to drive the feed screw in the cartridge assembly 58 (described below). In this manner, high-performance control is maintained over material dispensing. For example, rotary position, rotational velocity, and acceleration/deceleration of the feed screw can be readily controlled by the closed-loop servo motor, and is easily programmed at the controller 43. This is compared to conventional embodiments that rely on timed open-loop coasting of a mechanical clutch for control over the feed screw. Additionally, the closed-loop servo-motor is generally a compact system that is small, lightweight, and designed for high-performance operation; as compared to the bulky, inefficient, and inaccurate conventional motor pump systems.

An optional planetary-gear transmission box 44 may be provided to step down the available motor positions, thereby providing even more enhanced control over angular position of the feed screw. For example, step-down transmissions offering 7:1, 25:1, and 48:1 step-down ratios are available for increasing the number of angular steps from 8,192 to 57,344, 204,800 and 393,216 respectively, depending on the application. Such transmission boxes are also available in compact units that match well in size and weight with the closed-loop servo motor 42.

The pump housing 52 comprises a machined or die cast body having an opening 49 at a top portion for receiving the motor drive axle 41 or optional transmission box 44 drive axle (not shown). The interior of the housing 52 is hollow for receiving a cartridge 58 that extends through the housing 52 from an opening 51 at a bottom portion, upward to the top portion, and interfaces with the motor drive axle or transmission box drive axle. The motor 42 and transmission box 44 are mounted to each other, and to the housing 52, by bolts 46, and screws 24, 28, and 30. Cavities 53 are preferably provided in the walls of the housing 52, in order to reduce weight.

Figure 6B:
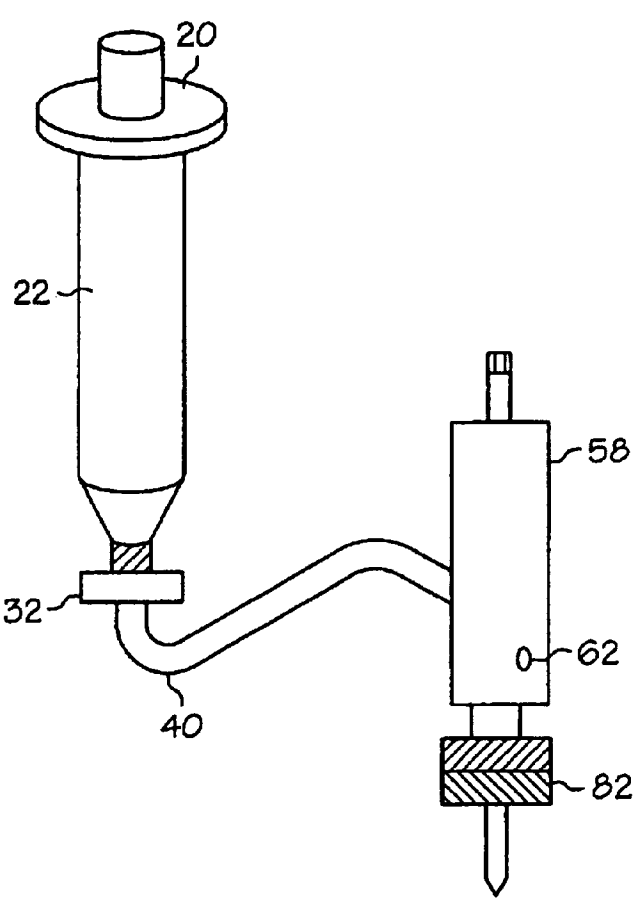
FIGS. 6A and 6B illustrate operation of the syringe and cartridge quick release mechanisms, in accordance with the present invention.
Figure 6A:
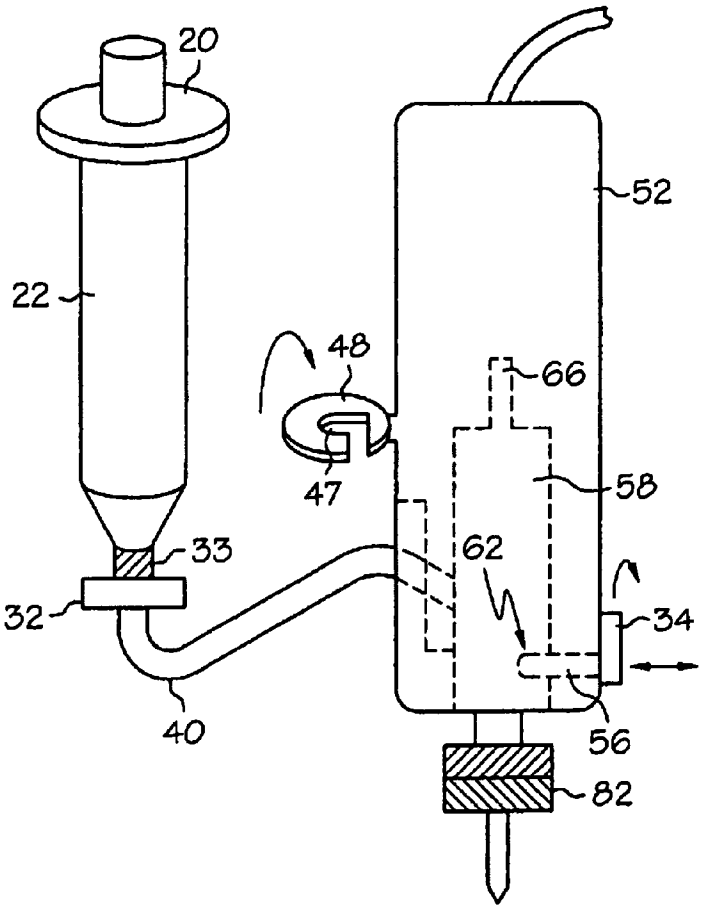

A cartridge release lever 34 is rotatably mounted to the housing 52 by bolt 38. When rotated, the cartridge release lever 34 engages an actuator pin 56, biased by spring 54 to remain in a released position. With reference to FIGS. 6A and 6B, the actuator pin 56 extends into the body of the housing 52 and engages an actuator pin capture 62 (see FIG. 2B) or elongated actuator pin capture (see FIG. 3B) formed in the cartridge body 60. In this manner the cartridge release lever is operable to remove/insert a cartridge 58 at the underside of the housing 52 as indicated by arrow 95 (see FIG. 1B).

A syringe 22 and feed tube 40 are releasibly coupled to a side wall of the housing, as shown. The syringe 22 includes a syringe holder 20, a syringe body 22, and a syringe outlet 32. The feed tube 40 is preferably formed of a flexible material, a first end of which elastically deforms to fit over the end of the syringe outlet 32 to form a tight seal. The second end of the feed tube 40 inserts into a feed aperture 64 (see FIGS. 2B and 3B) formed in the cartridge body 60.

With reference again to FIGS. 6A and 6B, the syringe 22 is likewise preferably configured to be readily separable from the pump housing 52, along with the cartridge 58. To accommodate this feature, a syringe quick-release arm 48 extends from a side wall of the pump housing 52, and includes a slot for map-capturing a neck portion 33 of the syringe outlet. The quick release arm preferably elastically deforms to receive the neck 33, and to fix the syringe 22 in position during a dispensing operation. In this manner, the cartridge release lever 34 operates in conjunction with the syringe quick release arm to allow for easy removal and storage of the cartridge mechanism 58 and syringe 22 as a unit. This is especially helpful in situations where overnight refrigeration of the dispensing material is required, since the entire material pathway can be removed and stored as a unit, without the need for disassembly and cleaning of the individual components, as required by conventional pump configurations.

Figure 7A:
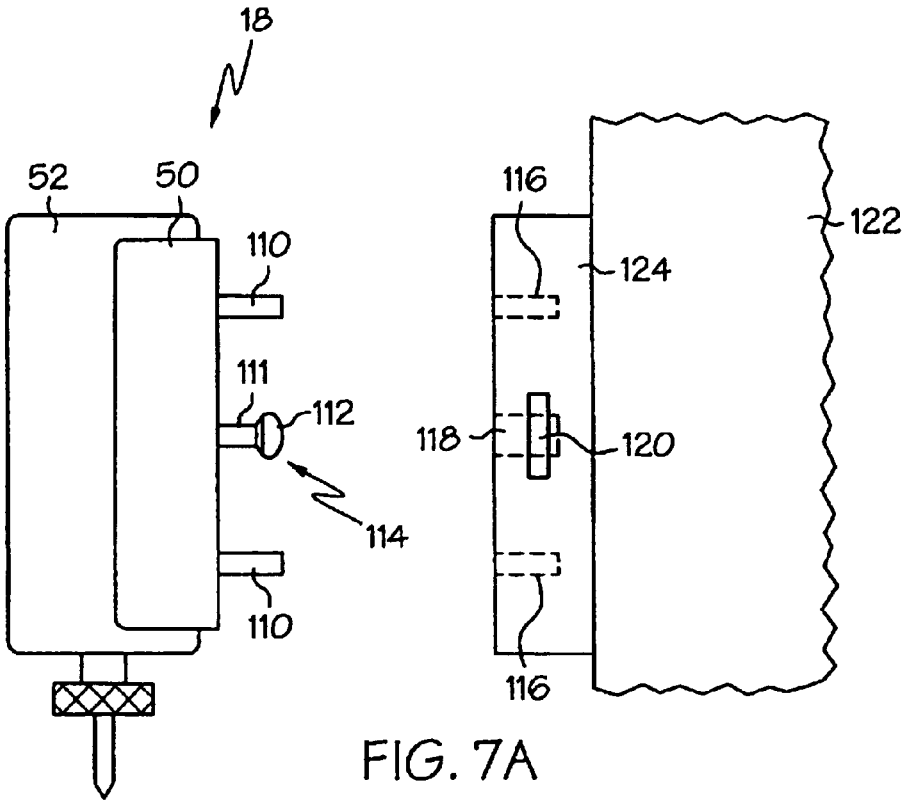
FIGS. 7A and 7B illustrate a side view and front view respectively of a quick-release mounting plate, for mounting the pump to a pump dispensing frame, in accordance with the present invention.
Figure 7B:
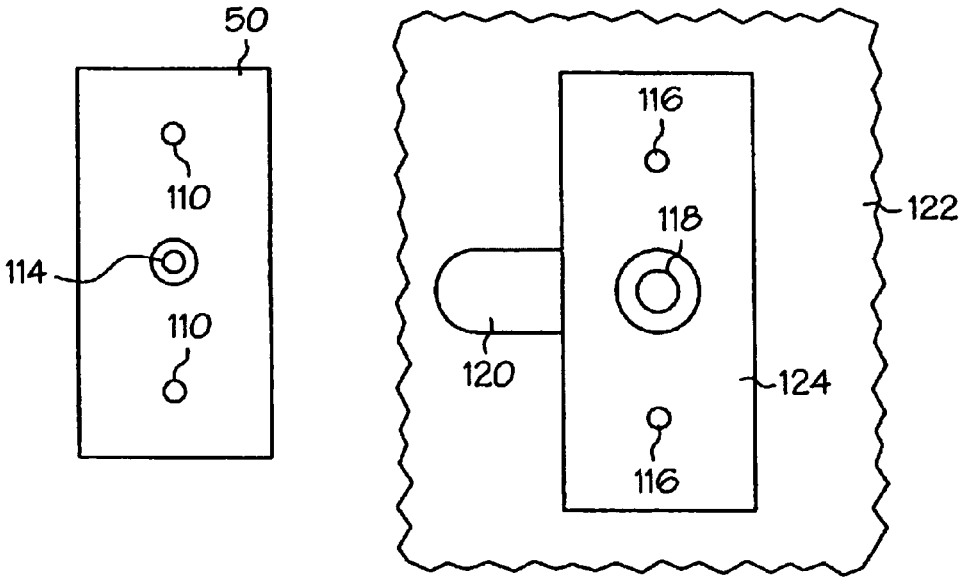

A release bracket 50 is mounted to a side wall of the housing 52 by bolts 36. With reference to FIGS. 7A and 7B, the release bracket 50 includes first and second alignment pins 110 and a central lock pin 114, including a body 11 and retaining head 112, extending outwardly from its surface. A corresponding release bracket plate 124 is mounted to a dispensing frame 122, and includes alignment pin captures 116, a lock pin capture 118 and a spring-loaded lever 120. When operated, the lever, engages/disengages a clasp within the lock pin capture 118, that, in turn, clasps the retaining head 112 of the release bracket, when inserted and properly aligned with the plate 124. In this manner, the pump 18 can be readily attached/detached from the pump dispensing frame for maintenance and inspection.

Figure 2A:
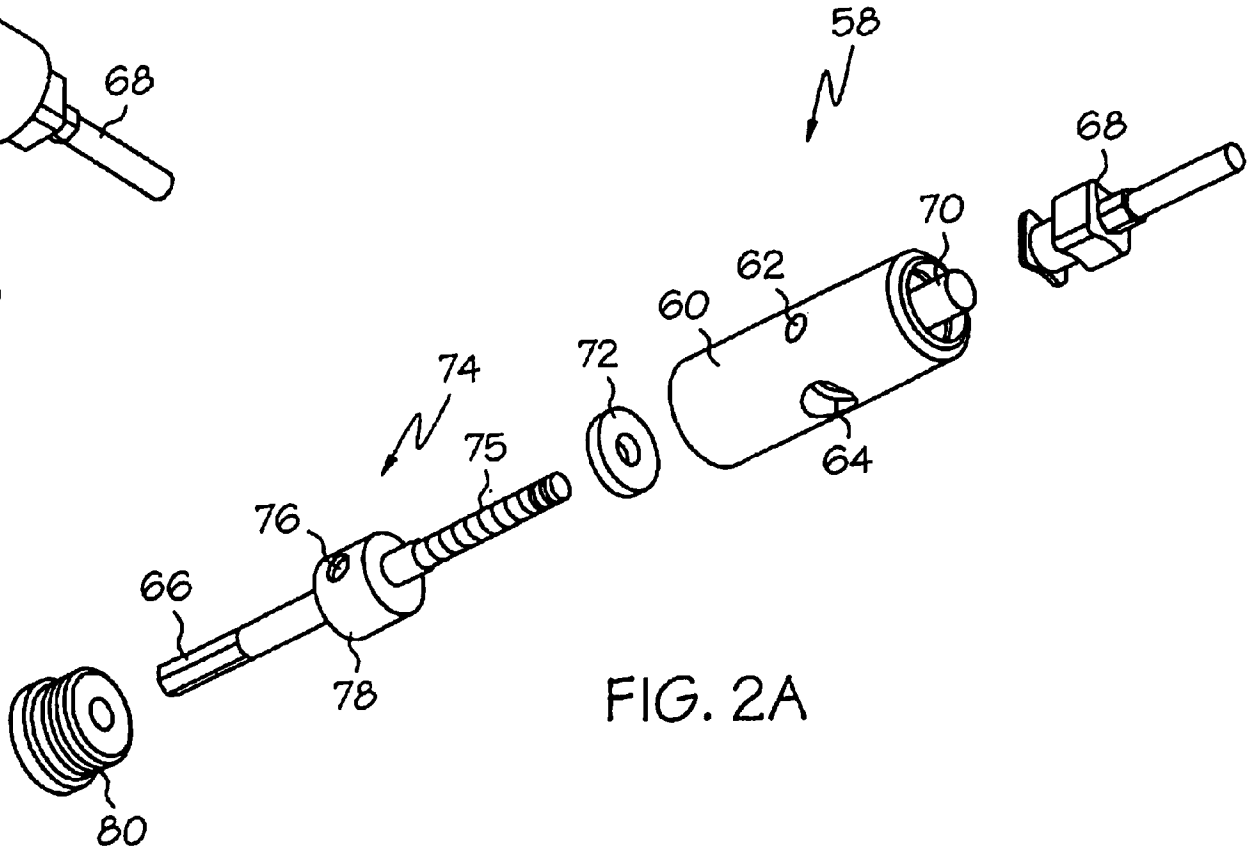
FIGS. 2A and 2B are an exploded perspective view and an assembled perspective view respectively of a fixed-z-type cartridge assembly in accordance with the present invention.
Figure 2B:
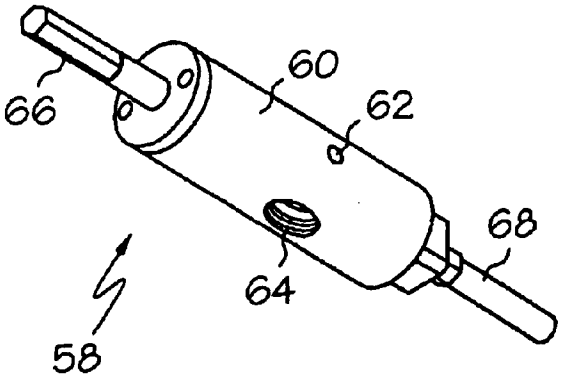

FIGS. 2A and 2B are an exploded perspective view and an assembled perspective view respectively of a fixed-z-type cartridge 58 assembly in accordance with the present invention. The cartridge assembly includes an elongated cartridge body 60, a first end of which is adapted to receive a fixed-z-type dispensing needle, for example Laser™-style needle 68. An opening at a second end of the cartridge receives an auger screw, or feed screw 74 having threads 75 at a first end, and having an indexed shaft 66 at an opposite end, adapted to register with the motor axle 41, or transmission axle. The auger screw 74 includes a collar 78, the height of which is adjustable by set screw 76. Washer 72 ensures a tight seal. A cap nut 80 contains the various cartridge components within the cartridge body 60. As explained above, an inlet port 64 is formed in the body 60 of the cartridge for receiving an end of the feed tube, for the delivery of material toward the feed screw threads 75. An actuator pin capture 62 engages the cartridge release pin 56, as described above. In the fixed-z embodiment of FIGS. 2A and 2B, the actuator pin capture 62 is the size of the release pin, to prevent longitudinal travel of the pump.

Figure 3A:
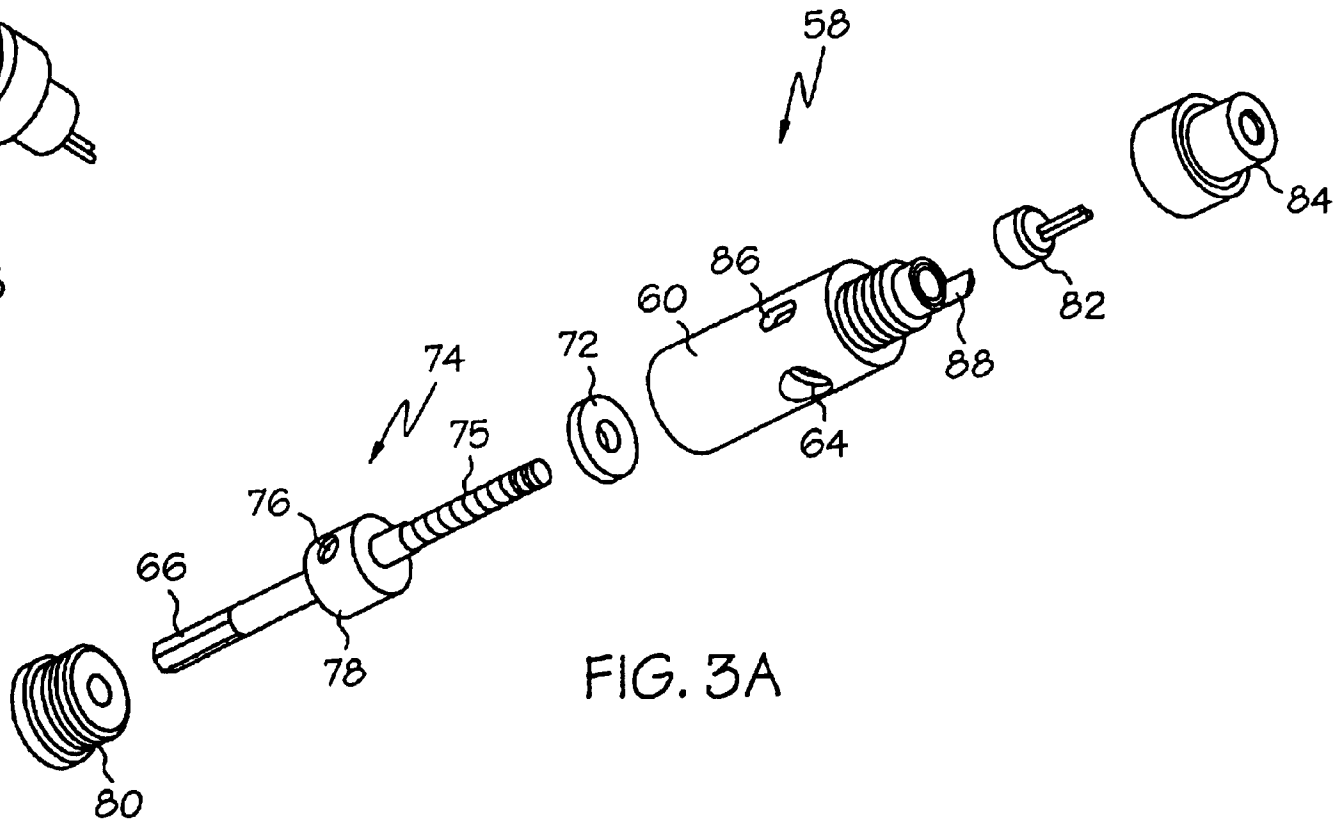
FIGS. 3A and 3B are an exploded perspective view and an assembled perspective view respectively of a floating-z-type cartridge assembly in accordance with the present invention
Figure 3B:
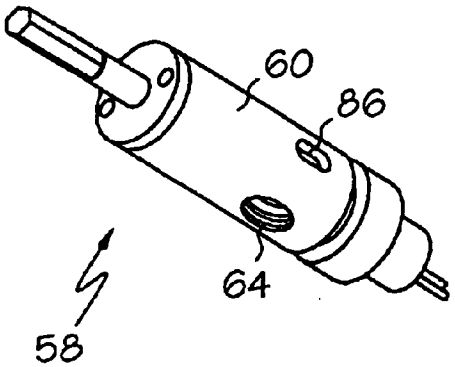

FIGS. 3A and 3B are an exploded perspective view and an assembled perspective view respectively of a floating-z-type cartridge 58 assembly in accordance with the present invention. In this embodiment, the feed screw mechanism is similar to that of FIGS. 2A and 2B; however, the cartridge is adapted for receiving a floating-z-type dispensing needle 82. The needle body 82 registers with locator 88 at the cartridge outlet, and is fixed in place by needle nut 84. For the floating-z-type cartridge assembly, an elongated actuator pin capture 86 is provided to allow for longitudinal travel of the cartridge 58 relative to the pump housing 52 during a dispensing operation.

Figure 4A:
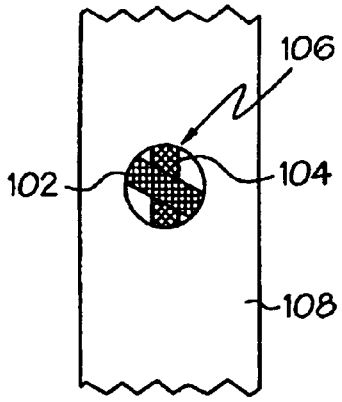
FIGS. 4A, 4B and 4C are side views of a cartridge opening illustrating the conventional embodiment having a small, circular opening, and first and second embodiments of the present invention having elongated openings respectively.

FIGS. 4A of a inlet port for a conventional cartridge 108 embodiment having a small, circular port opening 106. In this embodiment, it can be seen that the pressurized material entering the port opening 106 periodically confronts a major diameter of the feed screw thread 102, which periodically inhibits flow of material into the feed screw cavity formed between the minor diameter portion 104 of the thread and the interior wall of the cartridge body 108. As much as ⅓ to ½ of the port opening can be periodically blocked by the major diameter of the feed screw thread 102 at any given time. The blockage fluctuates as a function of the rotational position of the feed screw which can cause inconsistency in material dispensing, especially at small tolerances. The blockage further increases the likelihood of material stagnation and drying at the inlet port, in turn causing system contamination.

Figure 4B:
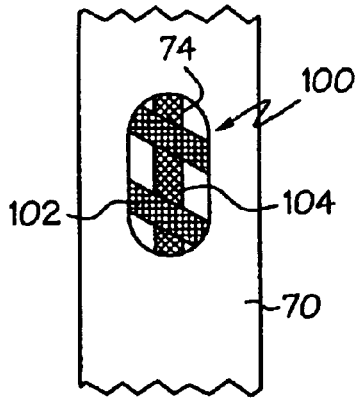
Figure 4C:
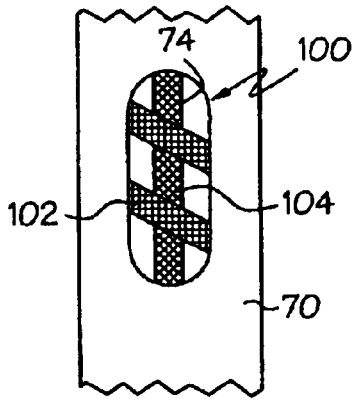

The present invention overcomes this limitation by providing an elongated cartridge inlet port. With reference to FIGS. 4B and 4C, the elongated inlet port 100 of the present invention is preferably elongated in a longitudinal direction, with respect to the longitudinal axis of the feed screw 74. In this manner, dispensing material is presented to a larger portion of the feed screw cavity formed between the minor diameter portion 104 and the inner wall of the cartridge 70. This configuration reduces pressure requirements for material delivery through the system, and enhances consistency in material flow, as the dependency on material flow rate as a function of the feed screw thread position is mitigated or eliminated. In general, a longer inlet port as shown in FIG. 3 is preferred, as compared to the relatively shorter inlet port 100 shown in FIG. 4B; however, the inlet port 100 should not be so long as to provide an opportunity for pooling of dormant material in the inlet port 100 prior to flow through the feed screw 74.

Figure 5A:
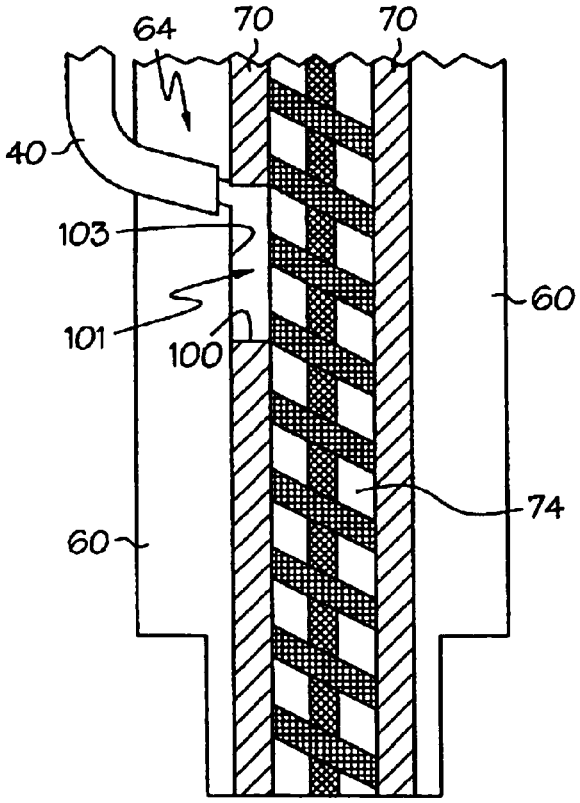
FIG. 5A is a cutaway side view of a cartridge feed mechanism employing a carbide liner including an elongated slot at the inlet to allow for increased capturing of input material at the feed screw inlet, in order to promote consistency in material flow at a reduced pressure, in accordance with the present invention.
Figure 5B:
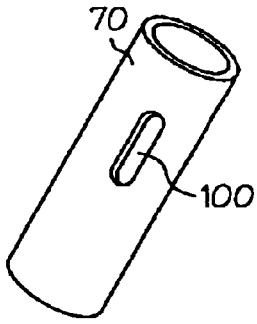
FIG. 5B is a perspective view of the liner having an elongated slot, in accordance with the present invention.

FIG. 5A is a cutaway side view of a cartridge feed mechanism employing a carbide liner 70 including an elongated slot 100 at the inlet port to allow for increased capturing of input material at the feed screw inlet, in order to promote consistency in material flow at a reduced pressure, in accordance with the present invention. FIG. 5B is a perspective view of the liner having an elongated slot, in accordance with the present invention.

In this embodiment, the elongated inlet port is provided by a slot 100 formed in a side wall of a cylindrical carbide liner 70 inserted in the cartridge body 60 about the feed screw 74. The cartridge inlet port 64 comprises a standard circular bore formed in the cartridge body 60, preferably at an acute angle relative to the feed screw 74, to allow gravity to assist in material flow. An elongated chamber, or pocket 101, is formed within the slot 100, between the feed screw 74 and the inner wall 103 of the cartridge body, in a region proximal to the inlet port 64. The elongated pocket 101 allows for dispensing fluid to migrate in a downward direction, and is captured by the feed screw threads over a larger surface area, conferring the various advantages outlined above.

Figure 8:
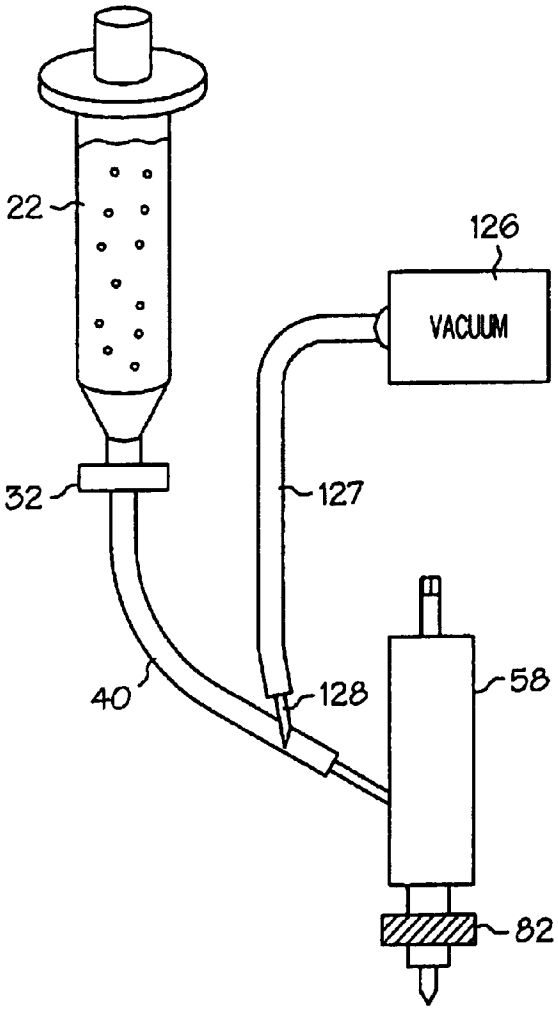
FIG. 8 is a illustration of an improved dispensing configuration employing a vacuum tube inserted into the material feed tube, in accordance with the present invention.

FIG. 8 is a illustration of an improved dispensing configuration employing a vacuum tube inserted into the material feed tube. In this embodiment, entrapped gas impurities, such as air microbubbles, are drawn from the material supply during a dispensing operation, thereby purging the system of entrapped air. A vacuum unit 126 draws a vacuum from the material supply tube 40, for example by a vacuum tube 127 with needle 128 inserted into the material feed tube 40, along the direction of material flow, as shown. In this manner, air is withdrawn from the dispensed material, leading to an improvement in dispensing consistency, especially at small tolerances.

Figure 9:
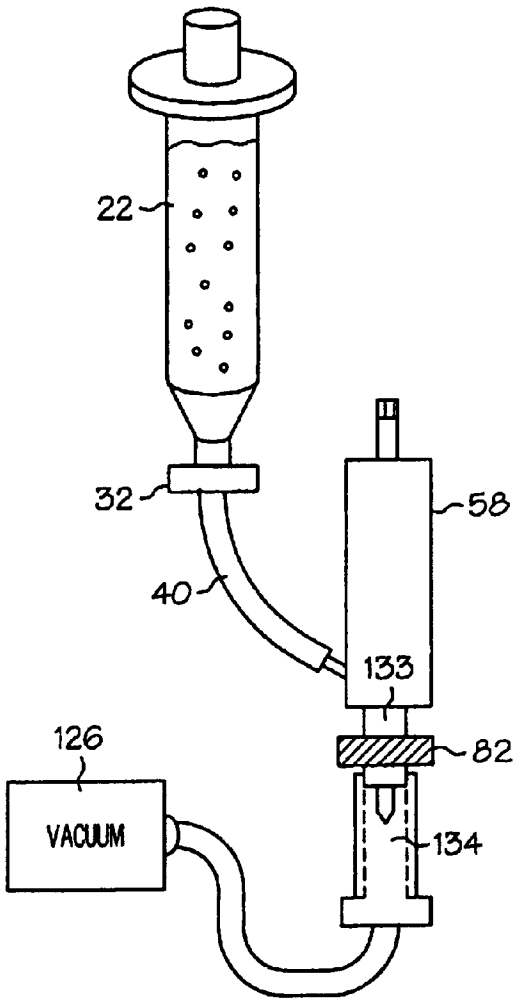
FIG. 9 is an illustration of an air purge configuration wherein a purge vacuum is applied to the needle assembly for initially purging the material flow of air pockets, to prime the system for dispensing, in accordance with the present invention.

FIG. 9 is an illustration of an air purge configuration wherein a purge vacuum is applied to the needle assembly for initially purging the material flow of air pockets, to prime the system for dispensing. In this process a first purge interface 134 is placed on the end of the feed tube, and a vacuum is drawn by vacuum unit 126, thereby purging the feed tube 40 of entrapped gas. A second purge interface 134 is then placed on the cartridge body outlet 133 while the feed screw is rotated slowly until material presents itself at the outlet 133. A vacuum is drawn by vacuum unit 126 to eliminate entrapped gas from the cartridge. A third purge interface 134 is then placed on the needle assembly 82 and a vacuum is drawn by vacuum unit 126 to eliminate entrapped air from the needle body. Entrapped air is thus substantially removed from the feed tube, auger screw and dispensing needle. Normal dispensing can commence following removal of the purge interface. Note that the first, second and third purge interfaces 126 may require different interface configurations for the different components undergoing purging.

Figure 10:
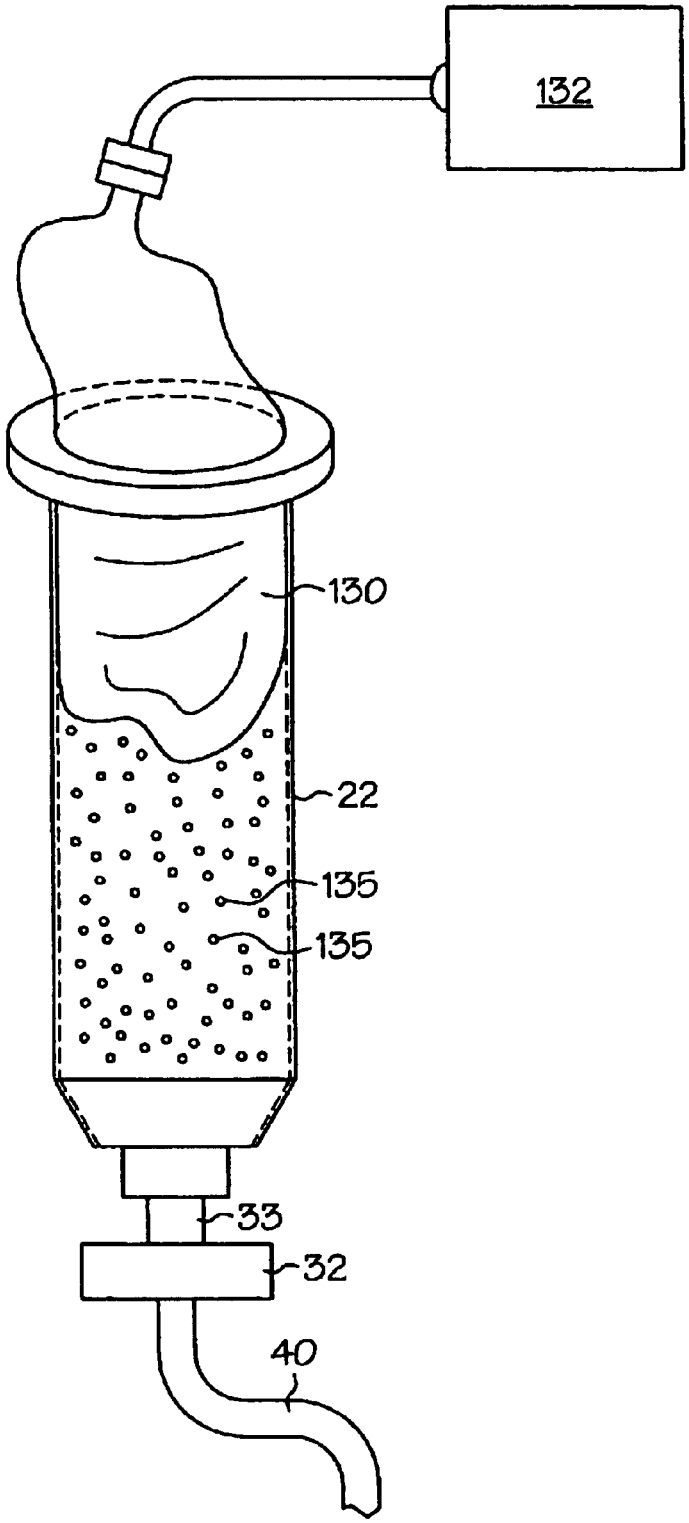
FIG. 10 is an illustration of a bellows configuration for application to the top of a material feed syringe, allowing for use of minimal pressure to drive material flow with mitigation or elimination of air migration into the material, in accordance with the present invention.

FIG. 10 is an illustration of a bellows configuration for application to the top of a material feed syringe, allowing for use of minimal pressure to drive material flow with mitigation or elimination of air migration into the material. In this configuration, a bellows means 130, for example comprising an air-tight, flexible material, is inserted at the piston end of, and replaces the piston of, a dispensing syringe 22. The bellows is pressurized by air pressure unit 132 from within and expands, thereby exerting pressure on the underlying material 135, forcing material flow through the outlet 32. In this manner, material can be driven with minimal pressure, and with minimal air migration into the material, as compared to plunger-style drivers. In a preferred embodiment, the bellows comprises a latex film applied about the lip of the syringe top. The flexible latex film serves to conform to the inner walls of the syringe during expansion, pushing the underlying material in a downward direction The syringe top is preferably vented to allow for expansion of the bellows.

In this manner a high-performance, lightweight pump configuration is provided. The pump is operable in both fixed-z and floating-z mode. Quick release mechanisms provide for storage of the syringe and cartridge as a single unit, without the need for component disassembly. The components themselves are relatively easy to clean and maintain. The elongated inlet port provides for enhanced dispensing consistency at a lower material pressure, while the various purging and priming techniques allow for removal of entrapped gases, further improving dispensing consistency.

While this invention has been particularly shown and described with reference to preferred embodiments thereof, it will be understood by those skilled in the art that various changes in form and detail may be made herein without departing from the spirit and scope of the invention as defined by the appended claims.

For example, the enhanced control over material flow offered by the various configurations of the present invention make the pump system of the present invention especially amenable to use with dispense needles having a flat dispensing surface with a cross pattern formed in the dispensing surface for dispensing *a* cross [patterns] *pattern* for providing a [fillets] *fillet* for [boding] *bonding* a [dye] *die* to a substrate. Particularly, since the closed-loop servo motor pump of the present invention offers control over both position and velocity of the feed screw, the delivery of fluid through the needle to the cross pattern can be controlled to a level of precision previously unattainable. Cross-pattern-style fillets can be achieved at a level of accuracy orders of magnitude beyond those currently achieved.

I claim:

1. A fluid dispensing pump comprising:

a feed screw having a helical cavity defined between a major diameter and a minor diameter of a thread of the feed screw;

a cartridge body, *the cartridge body and the feed screw comprising a detachable cartridge unit, the cartridge unit* having a feed port in communication with the feed screw for introduction of dispensing fluids into the helical cavity; [and]

*a pump housing including a cartridge cavity, the cartridge cavity having a mounting location at which the cartridge unit including both the cartridge body and the feed screw is inserted into and removed from the cartridge cavity, the pump housing releasibly securing the cartridge unit in the cartridge cavity, the cartridge unit having a motor interface at a first end of the cartridge unit and a fluid outlet and a second end of the cartridge unit opposite the first end, the cartridge unit including a fluid path between the feed port and the fluid outlet;* a closed-loop servo-motor, *the servo-motor* having indexed rotational positions [for controlling rotational position of the feed screw during a dispensing operation], *the servo-motor including a rotary encoder that generates a data signal related to the rotational position of the feed screw, and the motor interface of the cartridge unit being releasably coupled to the servo-motor when the cartridge unit is inserted into the cartridge cavity; and*

*a motor controller that receives the rotational position data signal from the encoder, and, in response, transmits a control signal to the servo-motor for controlling the rotary position and rotational velocity of the feed screw during a dispensing operation, to control a flow of dispensing fluid in the fluid path through the feed port to the fluid outlet during the dispensing operation.*

2. The pump of claim 1 wherein the cartridge body comprises a first outer body, and a second inner body, the feed port further comprising a feed cavity that is formed in the inner body.

3. The pump of claim 1 wherein the closed-loop servo motor further comprises a positional encoder.

4. The pump of claim 1 further comprising a transmission coupled between the motor and feed screw for gearing the feed screw relative to the motor.

5. The pump of claim 1 further comprising a notch on an outer surface of the cartridge body adapted to mate with a pin mounted to [a] *the* pump [body] *housing* for securing the cartridge body to the pump [body] *housing*.

6. The pump of claim 5 wherein the notch comprises a groove for allowing translation of the cartridge body relative to the pump [body] *housing* over the length of the groove.

7. The pump of claim 5 wherein the notch comprises a hole for fixing the longitudinal position of the cartridge body relative to the pump [body] *housing*.

8. The pump of claim 5 further comprising a cartridge release lever for releasibly engaging the pin such that the cartridge body can be released from the pump [body] *housing*.

9. The pump of claim 5 further comprising a fluid container retention arm on the pump [body] *housing* for releasibly securing a fluid container to the pump [body] *housing*.

10. The pump of claim 9 wherein the retention arm is adapted to clasp a neck of a syringe.

11. The pump of claim 5 further comprising a pump release bracket for releasibly mounting the pump [body] *housing* to a pump dispensing frame.

12. The pump of claim 1 wherein the feed port comprises a feed cavity that is positioned along a side portion of the feed screw.

[13. The pump of claim 12 wherein the feed port comprises a cavity that is elongated in a direction substantially along a longitudinal axis of the feed screw.]

[14. The pump of claim 12 wherein the feed port comprises a cavity that is elongated in a direction substantially parallel to a longitudinal axis of the feed screw.]

15. The pump of claim [13] *2* wherein the inner body comprises carbide.

[16. The pump of claim 1 wherein the feed port comprises a feed cavity that is positioned at a top portion of the feed screw.]

17. A fluid dispensing pump comprising:

a feed screw having a helical cavity defined between a major diameter and a minor diameter of a thread of the feed screw;

a cartridge body having a feed cavity in communication with the feed screw for introduction of dispensing fluids into the helical cavity, the cartridge body having a notch on an outer surface adapted to mate with a pin mounted to a pump body [for securing] *to releasibly secure* the cartridge body *and the feed screw* to the pump body; and a [motor] *closed-loop servo-motor* having indexed rotational positions for controlling rotational position of the feed screw during a dispensing operation, *the servo-motor including a rotary encoder that generates a feed-back signal related to the rotational position of the feed screw.*

18. The pump of claim 17 wherein the notch comprises a groove for allowing translation of the cartridge body relative to the pump body over the length of the groove.

19. The pump of claim 17 wherein the notch comprises a hole for fixing the longitudinal position of the cartridge body relative to the pump body.

20. The pump of claim 17 further comprising a cartridge release lever for releasibly engaging the pin such that the cartridge body can be released from the pump body.

21. The pump of claim 17 further comprising a fluid container retention arm on the pump body for releasibly securing a fluid container to the pump body.

22. The pump of claim 21 wherein the retention arm is adapted to clasp a neck of a syringe.

23. The pump of claim 17 further comprising a pump release bracket for releasibly mounting the pump body to a pump dispensing frame.

24. The pump of claim 17 wherein the feed cavity is positioned along a side portion of the feed screw.

[25. The pump of claim 17 wherein the feed cavity is positioned at a top portion of the feed screw.]

[26. The pump of claim 24 wherein the feed cavity is elongated in a direction substantially along a longitudinal axis of the feed screw.]

[27. The pump of claim 24 wherein the feed cavity is elongated in a direction substantially parallel to a longitudinal axis of the feed screw.]

28. The pump of claim 17 wherein the cartridge body comprises a first outer body, and a second inner body, the feed cavity being formed in the inner body.

29. The pump of claim 28 wherein the inner body comprises carbide.

30. The pump of claim 17 wherein the motor comprises a closed-loop servo-motor having a positional encoder.

31. The pump of claim 17 further comprising a transmission coupled between the motor and feed screw for gearing the feed screw relative to the motor.

32. A fluid dispensing pump comprising:

a feed screw having a helical cavity defined between a major diameter and a minor diameter of a thread of the feed screw;

a cartridge body, *the cartridge body and the feed screw comprising a detachable cartridge unit, the cartridge unit* having a feed cavity in communication with the feed screw [and positioned at a top portion of the feed screw] for introduction of dispensing fluids into the helical cavity; [and]

*a pump housing including a cartridge cavity, the cartridge cavity having a mounting location at which the cartridge unit including both the cartridge body and the feed screw is inserted into and removed from the cartridge cavity, the pump housing releasibly securing the cartridge unit in the cartridge cavity, the cartridge unit having a motor interface at a first end of the cartridge unit and a fluid outlet at a second end of the cartridge unit opposite the first end, the cartridge unit including a fluid path between the feed cavity and the fluid outlet;* a [motor] *closed-loop servo-motor* having indexed rotational positions for controlling rotational position of the feed screw during a dispensing operation, *the servo-motor including a rotary encoder that generates a feedback signal related to the rotational position of the feed screw, and the motor interface of the cartridge unit being releasibly coupled to the servo-motor when the cartridge unit is inserted into the cartridge cavity; and*

*a programmable motor controller that transmits control signals to the servo-motor to control the rotational position of the feed screw in response to the feedback signal, to control a flow of dispensing fluid in the fluid path through the feed cavity to the fluid outlet during the dispensing operation.*

33. The pump of claim 32 wherein the cartridge body comprises a first outer body, and a second inner body, the feed cavity being formed in the inner body.

34. The pump of claim 33 wherein the inner body comprises carbide.

35. The pump of claim 32 wherein the [motor comprises a] closed-loop servo-motor [having] *comprises* a positional encoder.

36. The pump of claim 32 further comprising a transmission coupled between the motor and feed screw for gearing the feed screw relative to the *servo*-motor.

37. The pump of claim 32 further comprising a notch on an outer surface of the cartridge body adapted to mate with a pin mounted to [a] *the* pump [body] *housing* for securing the cartridge body to the pump [body] *housing*.

38. The pump of claim 37 wherein the notch comprises a groove for allowing translation of the cartridge body relative to the pump [body] *housing* over the length of the groove.

39. The pump of claim 37 wherein the notch comprises a hole for fixing the longitudinal position of the cartridge body relative to the pump [body] *housing*.

40. The pump of claim 37 further comprising a cartridge release lever for releasibly engaging the pin such that the cartridge body can be released from the pump [body] *housing*.

41. The pump of claim 37 further comprising a fluid container retention arm on the pump [body] *housing* for releasibly securing a fluid container to the pump [body] *housing*.

42. The pump of claim 41 wherein the retention arm is adapted to clasp a neck of a syringe.

43. The pump of claim 37 further comprising a pump release bracket for releasibly mounting the pump [body] *housing* to a pump dispensing frame.

44. A fluid dispensing pump comprising:

a feed screw having a helical cavity defined between a major diameter and a minor diameter of a thread of the feed screw;

a cartridge body, *the cartridge body and the feed screw comprising a detachable cartridge unit, the cartridge unit* having a feed port in communication with the feed screw for introduction of dispensing fluids into the helical cavity; [and]

*a pump housing including a cartridge cavity, the cartridge cavity having a mounting location at which the cartridge unit including both the cartridge body and the feed screw is inserted into and removed from the cartridge cavity, the pump housing releasibly securing the cartridge unit in the cartridge cavity, the cartridge unit having a motor interface at a first end of the cartridge unit and a fluid outlet at a second end of the cartridge unit opposite the first end, the cartridge unit including a fluid path between the feed port and the fluid outlet;* a *closed-loop servo*-motor having indexed rotational positions for controlling rotational position of the feed screw during a dispensing operation, [the motor being] *the motor interface of the cartridge unit being releasably coupled to the servo-motor when the cartridge unit is inserted into the cartridge cavity; and*

*a programmable motor controller* in communication with [a controller] *the closed-loop servo-motor* that receives a feedback signal from the *servo*-motor related to the rotational position of the feed screw, *and, in response, generates control signals that are transmitted to the servo-motor for controlling the rotary position and rotational velocity of the feed screw during a dispensing operation, to control a flow of dispensing fluid in the fluid path through the feed port to the fluid outlet during the dispensing operation.*

[45. The pump of claim 44 wherein the feed port comprises a feed cavity that is elongated in a direction substantially along a longitudinal axis of the feed screw.]

[46. The pump of claim 44 wherein the feed port comprises a feed cavity that is elongated in a direction substantially parallel to a longitudinal axis of the feed screw.]

47. The pump of claim 44 wherein the cartridge body comprises a first outer body, and a second inner body, the feed port comprising a feed cavity that is formed in the inner body.

48. The pump of claim 47 wherein the inner body comprises carbide.

49. The pump of claim 44 wherein the [motor comprises a] closed-loop servo-motor [having] *comprises* a positional encoder.

50. The pump of claim 44 further comprising a transmission coupled between the motor and feed screw for gearing the feed screw relative to the *servo*-motor.

51. The pump of claim 44 wherein the feed port comprises a feed cavity that is positioned along a side portion of the feed screw.

[52. The pump of claim 44 wherein the feed port comprises a feed cavity that is positioned at a top portion of the feed screw.]

*53. A fluid dispensing pump comprising:*

*a cartridge body having a feed screw cavity and a feed screw mounted in the feed screw cavity, the cartridge body and the feed screw comprising a detachable cartridge unit, the feed screw having a helical cavity defined between a major diameter and a minor diameter of a thread of the feed screw in which the feed screw is mounted, the cartridge unit having a feed port in communication with the feed screw for introduction of dispensing fluids into the helical cavity, the feed screw including a neck that extends through a portion of the cartridge body;*

*a pump housing including a motor mount and a cartridge cavity, the cartridge cavity having a cartridge mounting location at which the cartridge unit including both the cartridge body and the feed screw is inserted into and removed from the cartridge cavity, the pump housing releasibly securing the cartridge unit in the cartridge cavity, the cartridge unit including the neck of the feed screw at a first end of the cartridge unit and a fluid outlet at a second end of the cartridge unit opposite the first end, the cartridge unit including a fluid path between the feed port and the fluid outlet; and*

*a closed-loop servo-motor mounted at the motor mount of the pump housing, the servo-motor having indexed rotational positions for controlling rotational position of the feed screw during a dispensing operation to control a flow of dispensing fluid in the fluid path through the feed port to the fluid outlet during the dispensing operation, the servo-motor including a drive axle that is aligned with the neck of the feed screw, and the neck of the feed screw of the cartridge unit being releasably coupled to the servo-motor when the cartridge unit is inserted into the cartridge cavity.*

*54. The fluid dispensing pump of claim 53 wherein the drive axle is coupled to the neck of the feed screw.*

*55. The fluid dispensing pump of claim 53 further comprising a transmission coupled between, and aligned with, the drive axle of the servo-motor and the neck of the feed screw for gearing the feed screw relative to the servo-motor.*

*56. The fluid dispensing pump of claim 53 further comprising a notch on an outer surface of the cartridge body adapted to mate with a pin mounted to a pump housing for securing the cartridge unit to the pump housing.*

*57. The fluid dispensing pump of claim 56 wherein the notch comprises a groove for allowing translation of the cartridge body relative to the pump housing over the length of the groove.*

*58. The fluid dispensing pump of claim 56 wherein the notch comprises a hole for fixing the longitudinal position of the cartridge body relative to the pump housing.*

*59. The fluid dispensing pump of claim 56 further comprising a cartridge release lever on the pump housing for releasibly engaging the pin such that the cartridge unit can be released from the pump housing.*

*60. The fluid dispensing pump of claim 53 wherein the motor mount is at first end of the pump housing and wherein the cartridge cavity includes an opening at which the cartridge body is inserted into the pump housing at a second end of the pump housing opposite the first end.*

*61. The fluid dispensing pump of claim 53 further comprising a motor controller that transmits control signals to the servo-motor to control the rotational position of the feed screw.*

*62. The fluid dispensing pump of claim 53 wherein the servo-motor includes a rotary encoder that generates a feedback signal related to the rotational position of the feed screw.*

*63. The fluid dispensing pump of claim 62 further comprising a motor controller that transmits control signals to the servo-motor to control the rotational position of the feed screw in response to the feedback signal.*

*64. The fluid dispensing pump of claim 63 wherein the motor controller transmits control signals to the servo-motor to further control the rotational velocity of the feed screw.*

*65. The fluid dispensing pump of claim 63 wherein the motor controller transmits control signals to the servo-motor to further control the rotational acceleration of the feed screw.*

*66. The fluid dispensing pump of claim 53 further comprising a pump release bracket for releasibly mounting the pump housing to a pump dispensing frame.*

*67. A fluid dispensing pump comprising:*

*a cartridge body having a feed screw cavity and a feed screw mounted in the feed screw cavity, the cartridge body and the feed screw comprising a detachable cartridge unit, the feed screw having a helical cavity defined between a major diameter and a minor diameter of a thread of the feed screw in which the feed screw is mounted, the cartridge unit having a feed port in communication with the feed screw for introduction of dispensing fluids into the helical cavity;*

*a pump housing including a motor mount and a cartridge cavity, the motor mount positioned at a first end of the pump housing and the cartridge cavity including an opening at a second end of the pump housing opposite the first end at which opening the cartridge unit including both the cartridge body and the feed screw is inserted into and removed from the cartridge cavity, the pump housing releasibly securing the cartridge unit in the cartridge cavity, the cartridge unit having a motor interface at a first end of the cartridge unit and a fluid outlet at a second end of the cartridge unit opposite the first end, the cartridge unit including a fluid path between the feed port and the fluid outlet;*

*a closed-loop servo-motor mounted at the motor mount of the pump housing, the servo-motor having indexed rotational positions for controlling rotational position of the feed screw during a dispensing operation to control a flow of dispensing fluid in the fluid path through the feed port to the fluid outlet during the dispensing operation, the servo-motor including a drive axle that is aligned with a longitudinal axis of the feed screw, the motor interface of the cartridge unit being releasably coupled to the drive axle when the cartridge unit is inserted into the cartridge cavity.*

*68. The fluid dispensing pump of claim 67 wherein the feed screw includes a neck.*

*69. The fluid dispensing pump of claim 68 wherein the neck extends through a portion of the cartridge body.*

*70. The fluid dispensing pump of claim 68 wherein the drive axle is coupled to the neck of the feed screw.*

*71. The fluid dispensing pump of claim 68 further comprising a transmission coupled between, and aligned with, the drive axle of the servo-motor and the neck of the feed screw for gearing the feed screw relative to the servo-motor.*

*72. The fluid dispensing pump of claim 67 further comprising a notch on an outer surface of the cartridge body adapted to mate with a pin mounted to a pump housing for securing the cartridge unit to the pump housing.*

*73. The fluid dispensing pump of claim 72 wherein the notch comprises a groove for allowing translation of the cartridge body relative to the pump housing over the length of the groove.*

*74. The fluid dispensing pump of claim 72 wherein the notch comprises a hole for fixing the longitudinal position of the cartridge body relative to the pump housing.*

*75. The fluid dispensing pump of claim 72 further comprising a cartridge release lever on the pump housing for releasibly engaging the pin such that the cartridge unit can be released from the pump housing.*

*76. The fluid dispensing pump of claim 67 further comprising a motor controller that transmits control signals to the servo-motor to control the rotational position of the feed screw.*

*77. The fluid dispensing pump of claim 67 wherein the servo-motor includes a rotary encoder that generates a feedback signal related to the rotational position of the feed screw.*

*78. The fluid dispensing pump of claim 77 further comprising a motor controller that transmits control signals to the servo-motor to control the rotational position of the feed screw in response to the feedback signal.*

*79. The fluid dispensing pump of claim 78 wherein the motor controller transmits control signals to the servo-motor to further control the rotational velocity of the feed screw.*

*80. The fluid dispensing pump of claim 78 wherein the motor controller transmits control signals to the servo-motor to further control the rotational acceleration of the feed screw.*

*81. The fluid dispensing pump of claim 67 further comprising a pump release bracket for releasibly mounting the pump housing to a pump dispensing frame.*

*82. A fluid dispensing pump comprising:*

*a cartridge body having a feed screw cavity and a feed screw mounted in the feed screw cavity, the cartridge body and the feed screw comprising a detachable cartridge unit, the feed screw having a helical cavity defined between a major diameter and a minor diameter of a thread of the feed screw in which the feed screw is mounted, the cartridge unit having a feed port in communication with the feed screw for introduction of dispensing fluids into the helical cavity;*

*a pump housing including a motor mount and a cartridge cavity, the cartridge cavity having a mounting location at which the cartridge unit including both the cartridge body and the feed screw is inserted into and removed from the cartridge cavity, the pump housing releasibly securing the cartridge unit in the cartridge cavity, the cartridge unit having a motor interface at a first end of the cartridge unit and a fluid outlet at a second end of the cartridge unit opposite the first end, the cartridge unit including fluid path between the feed port and the fluid outlet;*

*a closed-loop servo-motor mounted at the motor mount of the pump housing, the servo-motor having indexed rotational positions for controlling rotational position of the feed screw during a dispensing operation, the servo-motor including a rotary encoder that generates a feedback signal related to the rotational position of the feed screw, the motor interface of the cartridge unit being releasably coupled to the servo-motor when the cartridge unit is inserted into the cartridge cavity; and*

*a motor controller that transmits control signals to the servo-motor to control the rotational position, rotational velocity and rotational acceleration of the feed screw in response to the feedback signal, to control a flow of dispensing fluid in the fluid path through the feed port to the fluid outlet during the dispensing operation.*

*83. The fluid dispensing pump of claim 82 wherein the servo-motor includes a drive axle that is aligned with a neck of the feed screw.*

*84. The fluid dispensing pump of claim 82 wherein the motor mount is positioned at a first end of the pump housing and wherein the cartridge cavity includes an opening at which the cartridge unit is inserted into the pump housing at a second end of the pump housing opposite the first end.*

*85. The fluid dispensing pump of claim 82 wherein the feed screw includes a neck.*

*86. The fluid dispensing pump of claim 82 wherein the neck extends through a portion of the cartridge body.*

*87. The fluid dispensing pump of claim 82 wherein the drive axle is coupled to the feed screw.*

*88. The fluid dispensing pump of claim 82 further comprising a transmission coupled between, and aligned with, the drive axle of the servo-motor and a longitudinal axis of the feed screw for gearing the feed screw relative to the servo-motor.*

*89. The fluid dispensing pump of claim 82 further comprising a notch on an outer surface of the cartridge body adapted to mate with a pin mounted to the pump housing for securing the cartridge unit to the pump housing.*

*90. The fluid dispensing pump of claim 89 wherein the notch comprises a groove for allowing translation of the cartridge body relative to the pump housing over the length of the groove.*

*91. The fluid dispensing pump of claim 89 wherein the notch comprises a hole for fixing the longitudinal position of the cartridge body relative to the pump housing.*

*92. The fluid dispensing pump of claim 89 further comprising a cartridge release lever on the pump housing for releasibly engaging the pin such that the cartridge unit can be released from the pump housing.*

*93. The fluid dispensing pump of claim 82 further comprising a pump release bracket for releasibly mounting the pump housing to a pump dispensing frame.*

*94. A fluid dispensing pump comprising: a cartridge body having a feed screw cavity and a feed screw mounted in the feed screw cavity, the feed screw having a helical cavity defined between a major diameter and a minor diameter of a thread of the feed screw in which the feed screw is mounted, the cartridge body having a feed port in communication with the feed screw for introduction of dispensing fluids into the helical cavity and having an output port at which the dispensing fluids are dispensed from the helical cavity, the cartridge body including an elongated notch on an outer surface thereof;*

*a pump housing including a motor mount and a cartridge cavity, the pump housing releasibly securing the cartridge body in the cartridge cavity, a cartridge pin coupled to the pump housing that engages the elongated notch of the cartridge body, such that when the cartridge is secured in the pump housing, the elongated notch provides for translation of the cartridge relative to the pump housing along its length during a dispensing operation;*

*a closed-loop servo-motor mounted at the motor mount of the pump housing, the servo-motor having indexed rotational positions for controlling rotational position of the feed screw during a dispensing operation, the servo-motor including a rotary encoder that generates a feedback signal related to the rotational position of the feed screw; and*

*a motor controller that transmits control signals to the servo-motor to control the rotational position, rotational velocity, and rotational acceleration of the feed screw in response to the feedback signal.*

*95. The fluid dispensing pump of claim 94 wherein the cartridge pin secures the cartridge in the pump housing and seats in the elongated notch to restrict an extent of translation of the cartridge in the pump housing.*

*96. The fluid dispensing pump of claim 94 wherein the cartridge pin is activated by a cartridge release lever.*

*97. The fluid dispensing pump of claim 96 wherein the cartridge release lever pivots relative to the cartridge housing.*

*98. The fluid dispensing pump of claim 94 wherein the servo-motor includes a drive axle that is aligned with a neck of the feed screw.*

*99. The fluid dispensing pump of claim 94 wherein the motor mount is positioned at a first end of the pump housing and wherein the cartridge cavity includes an opening at which the cartridge is inserted into the pump housing at a second end of the pump housing opposite the first end.*

*100. The fluid dispensing pump of claim 94 wherein the feed screw includes a neck.*

*101. The fluid dispensing pump of claim 100 wherein the neck extends through a portion of the cartridge body.*

*102. The fluid dispensing pump of claim 94 wherein the drive axle is coupled to the feed screw.*

*103. The fluid dispensing pump of claim 94 further comprising a transmission coupled between, and aligned with, the drive axle of the servo-motor and a longitudinal axis of the feed screw for gearing the feed screw relative to the servo-motor.*

*104. The fluid dispensing pump of claim 94 further comprising a pump release bracket for releasibly mounting the pump housing to a pump dispensing frame.*

*105. A fluid dispensing pump comprising:*

*a feed screw having a helical cavity defined between a major diameter and a minor diameter of a thread of the feed screw;*

*a cartridge body having a feed cavity in communication with the feed screw for introduction of dispensing fluids into the helical cavity, the cartridge body having a notch on an outer surface adapted to mate with a pin mounted to a pump body for securing the cartridge body to the pump body, wherein the notch comprises a groove for allowing translation of the cartridge body relative to the pump body over the length of the groove; and*

*a closed-loop servo-motor having indexed rotational positions for controlling rotational position of the feed screw during a dispensing operation, the servo-motor including a rotary encoder that generates a feedback signal related to the rotational position of the feed screw.*

*106. A fluid dispensing pump comprising:*

*a feed screw having a helical cavity defined between a major diameter and a minor diameter of a thread of the feed screw;*

*a cartridge body having a feed cavity in communication with the feed screw for introduction of dispensing fluids into the helical cavity, the cartridge body having a notch on an outer surface adapted to mate with a pin mounted to a pump body for securing the cartridge body to the pump body;*

*a cartridge release lever for releasibly engaging the pin such that the cartridge body can be released from the pump body; and*

*a closed-loop servo-motor having indexed rotational positions for controlling rotational position of the feed screw during a dispensing operation, the servo-motor including a rotary encoder that generates a feedback signal related to the rotational position of the feed screw.*

*107. A fluid dispensing pump comprising:*

*a cartridge body having a feed screw cavity and a feed screw mounted in the feed screw cavity, the feed screw having a helical cavity defined between a major diameter and a minor diameter of a thread of the feed screw in which the feed screw is mounted, the cartridge body having a feed port in communication with the feed screw for introduction of dispensing fluids into the helical cavity;*

*a pump housing including a motor mount and a cartridge cavity, the pump housing releasibly securing the cartridge body in the cartridge cavity;*

*a pump release bracket for releasibly mounting the pump housing to a pump dispensing frame;*

*a closed-loop servo-motor mounted at the motor mount of the pump housing, the servo-motor having indexed rotational positions for controlling rotational position of the feed screw during a dispensing operation, the servo-motor including a rotary encoder that generates a feedback signal related to the rotational position of the feed screw; and*

*a motor controller that transmits control signals to the servo-motor to control the rotational position, rotational velocity and rotational acceleration of the feed screw in response to the feedback signal.*

* * * * *